United States Patent
Rapaka et al.

(10) Patent No.: US 11,999,029 B2
(45) Date of Patent: Jun. 4, 2024

(54) ABRASIVE ARTICLES AND METHODS FOR FORMING SAME

(71) Applicants: SAINT-GOBAIN ABRASIVES, INC., Worcester, MA (US); SAINT-GOBAIN ABRASIFS, Conflans-Sainte-Honorine (FR)

(72) Inventors: Srikanth Rapaka, Lowell, MA (US); Stephen E. Fox, Worcester, MA (US); Nilanjan Sarangi, Shrewsbury, MA (US)

(73) Assignees: SAINT-GOBAIN ABRASIVES, INC., Worcester, MA (US); SAINT-GOBAIN ABRASIFS, Conflans-Sainte-Honorine (FR)

( * ) Notice: Subject to any disclaimer, the term of this patent is extended or adjusted under 35 U.S.C. 154(b) by 0 days.

(21) Appl. No.: 16/457,542

(22) Filed: Jun. 28, 2019

(65) Prior Publication Data

US 2020/0001430 A1    Jan. 2, 2020

Related U.S. Application Data

(60) Provisional application No. 62/692,380, filed on Jun. 29, 2018.

(51) Int. Cl.
| | |
|---|---|
| *B24D 3/04* | (2006.01) |
| *B24D 3/10* | (2006.01) |
| *B24D 3/18* | (2006.01) |
| *B24D 18/00* | (2006.01) |
| *C09K 3/14* | (2006.01) |

(52) U.S. Cl.
CPC ............ *B24D 3/04* (2013.01); *B24D 3/10* (2013.01); *B24D 3/18* (2013.01); *B24D 18/00* (2013.01); *C09K 3/1436* (2013.01)

(58) Field of Classification Search
CPC ... B24D 3/04; B24D 3/10; B24D 3/18; B24D 18/00; C09K 3/1436
See application file for complete search history.

(56) References Cited

U.S. PATENT DOCUMENTS

| | | | |
|---|---|---|---|
| 3,252,775 | A | 5/1966 | Tocci-Guilbert |
| 3,377,411 | A | 4/1968 | Charvat |

(Continued)

FOREIGN PATENT DOCUMENTS

| | | | |
|---|---|---|---|
| CN | 1072423 | A | 5/1993 |
| CN | 106145946 | A | 11/2016 |

(Continued)

OTHER PUBLICATIONS

International Search Report for PCT/US2019/039966 dated Oct. 23, 2019, 3 pages.

(Continued)

*Primary Examiner* — Pegah Parvini
(74) *Attorney, Agent, or Firm* — Abel Schillinger, LLP; Arpan Ghosh (57) ABSTRACT

An abrasive article including a bonded abrasive body having a bond material including an inorganic material, abrasive particles contained within the bond material of the bonded abrasive body, porosity within a range of at least 55 vol % to not greater than 90 vol % for a total volume of the bonded abrasive body, and a Solid Phase Variation of not greater than 45%.

20 Claims, 4 Drawing Sheets

(56) References Cited

U.S. PATENT DOCUMENTS

| | | | |
|---|---|---|---|
| 4,574,063 A | 3/1986 | Scherer | |
| 4,938,784 A | 7/1990 | Murakami et al. | |
| 5,203,882 A | 4/1993 | Carman et al. | |
| 5,221,294 A | 6/1993 | Carman et al. | |
| 5,273,558 A * | 12/1993 | Nelson | C08G 18/5027 51/298 |
| 5,306,319 A | 4/1994 | Krishnan et al. | |
| 5,536,282 A | 7/1996 | Yoon et al. | |
| 6,375,692 B1 * | 4/2002 | Manwiller | B24D 18/00 51/296 |
| 7,481,855 B2 | 1/2009 | Rogers et al. | |
| 8,129,300 B2 | 3/2012 | His et al. | |
| 10,449,656 B2 | 10/2019 | Ozaki et al. | |
| 2003/0194947 A1 * | 10/2003 | Bright | B24D 3/26 451/28 |
| 2008/0085660 A1 | 4/2008 | Orlhac | |
| 2009/0311946 A1 | 12/2009 | Jeevanantham et al. | |
| 2010/0154315 A1 * | 6/2010 | Wu | B24D 18/00 51/296 |
| 2013/0143476 A1 | 6/2013 | Liu et al. | |
| 2014/0287658 A1 * | 9/2014 | Flaschberger | C09K 3/1409 451/28 |
| 2014/0290149 A1 | 10/2014 | Vedantham et al. | |
| 2015/0267097 A1 * | 9/2015 | Rosenflanz | C09K 3/1409 451/28 |
| 2016/0151886 A1 | 6/2016 | Sarangi et al. | |
| 2017/0008153 A1 * | 1/2017 | Sivasubramanian | C03C 8/14 |
| 2020/0001429 A1 | 1/2020 | Rapaka et al. | |
| 2021/0362298 A1 | 11/2021 | Ogasawara et al. | |

FOREIGN PATENT DOCUMENTS

| | | |
|---|---|---|
| EP | 1329439 A1 | 7/2003 |
| JP | H10277951 A | 10/1998 |
| JP | 2004331736 A | 11/2004 |
| JP | 2006224302 A | 8/2006 |
| JP | 4331736 B2 | 9/2009 |
| JP | 2014083621 A | 5/2014 |
| JP | 2014525355 A | 9/2014 |
| WO | 90/01397 A1 | 2/1990 |
| WO | 01/08848 A1 | 8/2001 |
| WO | 02/016286 A1 | 2/2002 |
| WO | 2012/031251 A2 | 3/2012 |
| WO | 2014192837 A1 | 12/2014 |
| WO | 2017200833 A1 | 11/2017 |
| WO | 2019193887 A1 | 10/2019 |
| WO | 2020/006491 A1 | 1/2020 |
| WO | 2020/006502 A1 | 1/2020 |

OTHER PUBLICATIONS

International Search Report for PCT/US2019/039946 dated Oct. 24, 2019, 3 pages.

Cholewa et al, "Technological aspects of particle-reinforced composites production", Materials & Design, vol. 18, Issues 4-6, pp. 401-405, Dec. 1, 1997.

* cited by examiner

ABRASIVE ARTICLES AND METHODS FOR FORMING SAME

CROSS-REFERENCE TO RELATED APPLICATION(S)

This application claims priority under 35 U.S.C. § 119(e) to U.S. Provisional Patent Application No. 62/692,380, filed Jun. 29, 2018, entitled "ABRASIVE ARTICLES AND METHODS FOR FORMING SAME," by Srikanth RAPAKA et al., which is assigned to the current assignee hereof and incorporated by reference herein in its entirety.

BACKGROUND OF THE INVENTION

Field of the Disclosure

The present invention relates in general to abrasive articles, and in particular, to bonded abrasive articles having a particular Solid Phase Variation.

Description of the Related Art

Abrasive articles used in machining applications typically include bonded abrasive articles and coated abrasive articles. A bonded abrasive article generally has a bond matrix containing abrasive particles. Bonded abrasive articles can be mounted onto a suitable machining apparatus and used in various applications, such as shaping, grinding, polishing, and cutting. The industry continues to demand improved abrasive tools to meet needs of gear grinding.

BRIEF DESCRIPTION OF THE DRAWINGS

The present disclosure may be better understood, and its numerous features and advantages made apparent to those skilled in the art by referencing the accompanying drawings.

DETAILED DESCRIPTION

The following is generally directed to bonded abrasive articles suitable for use in material removal operations. The bonded abrasive articles can be used in various applications, including for example, surface grinding, precision grinding operations (e.g., gear grinding operations), and the like. In one particular aspect, the abrasive article may include a bonded abrasive having a high degree amount of porosity. Reference herein to bonded abrasive articles includes reference to a three dimensional volume of an abrasive material having abrasive particles contained within a volume of a bond material. Bonded abrasive articles can be distinct from coated abrasive articles that may utilize a single layer of abrasive particles contained in a layer of bond or adhesive material. Moreover, the bonded abrasive articles of embodiments herein may include some porosity within the three-dimensional volume of the body.

Figure 1:
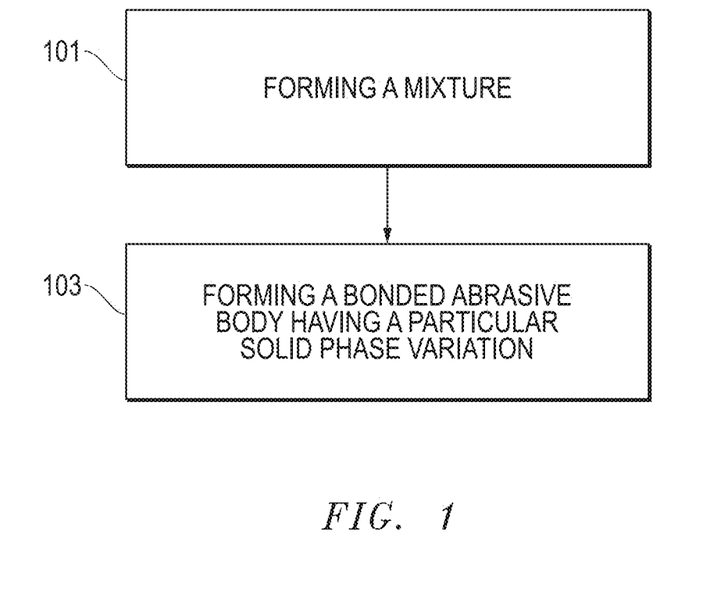
FIG. 1 includes a flow chart including a process for forming an abrasive article according to an embodiment.

FIG. 1 includes a flowchart for forming an abrasive article in accordance with an embodiment. As illustrated the process for forming the abrasive article can begin at step 101 by forming a mixture. The mixture can be a slurry including a plurality of components homogeneously mixed in therein. In accordance with an embodiment, the process of forming the mixture can include providing a carrier material. A carrier material may be a liquid suitable for containing solid components therein. For example, in one particular embodiment, the carrier can include water, more particularly, may consist essentially of water such as deionized water.

The process of forming the mixture may include adding a foaming agent to the carrier. A foaming agent may be a material that is a reactant for a foaming reaction that creates bubbles that facilitate the formation of an abrasive article having a high porosity content. In accordance with an embodiment, the foaming agent can include a liquid, gas, or solid material. In one embodiment, the foaming can include an inorganic material or organic material. In one particular embodiment, the foaming agent can include at least one of 1,1,1,3,3-pentafluoropropane 141b-1,1-Dichloro-1-fluoroethane (e.g., 245 fa Ennovate 141b), dicyclohexylcarbodiimide, sodium N-lauroylsarcosinate (e.g., Perlastan L30), hydrogen peroxide, sodium or potassium salts of long chain carboxylic acids, sodium stearate, disodium laureth sulfosuccinate, sodium sarcosinate or any combination thereof. According to one particular embodiment, the foaming agent is preferably hydrogen peroxide.

In accordance with one embodiment, the foaming agent may be added in a particular content. For example, mixture may include at least 0.5 wt % of the foaming agent for a total weight of the mixture, such as at least 1 wt % or at least 2 wt % or at least 3 wt % or at least 4 wt % or at least 5 wt % or at least 6 wt % or at least 7 wt % or at least 8 wt % or at least 9 wt % or at least 10 wt % or at least 12 wt % or at least 14 wt % or at least 16 wt % or at least 18 wt % or at least 20 wt % or at least 22 wt % or at least 24 wt % or at least 26 wt % or at least 28 wt % or at least 30 wt %. Still, in one non-limiting embodiment, the mixture may include not greater than 50 wt % of the foaming agent for a total weight of the mixture, such as not greater than 45 wt % or not greater than 40 wt % or not greater than 35 wt % or not greater than 30 wt % or not greater than 25 wt % or not greater than 20 wt % or not greater than 15 wt % or not greater than 10 wt % or not greater than 8 wt % or not greater than 5 wt %. The mixture may include a content of the foaming agent in an amount within a range including any of the minimum and maximum percentages noted above.

The addition of the foaming agent to the mixture may be completed at various times, including for example, prior to the addition of any dry components. In one particular embodiment, the foaming agent may be added first to the mixture, prior to the addition of any other components. The foaming agent may be a reactant to a foaming process that facilitates the formation of bubbles formed in the mixture or gel and further facilitates the formation of porosity in the final-formed abrasive article. One or more foaming processes can be used in combination with the foaming agent to facilitate a foaming process.

The process of forming the mixture may further include adding a bond precursor material to the carrier. A bond precursor material may be a material that becomes the bond material of the final-formed abrasive article. In accordance with an embodiment, the bond precursor material can include a powder material configured to form the bond material of the final-formed abrasive article. In one embodiment, the bond precursor material can include an inorganic material, such as, but not limited to, metals, metal alloys, ceramics, vitreous materials or frit materials, or any combination thereof. The bond precursor material may include inorganic material in an amorphous phase, polycrystalline phase, monocrystalline phase, or any combination thereof.

In accordance with one embodiment, the bond precursor material may be added in a particular content. For example, mixture may include at least 1 wt % of the precursor bond material for a total weight of the mixture, such as at least 2 wt % or at least 3 wt % or at least 4 wt % or at least 5 wt % or at least 6 wt % or at least 7 wt % or at least 8 wt % or at least 9 wt % or at least 10 wt % or at least 12 wt % or at least 14 wt % or at least 16 wt % or at least 18 wt % or at least 20 wt % or at least 22 wt % or at least 24 wt % or at least 26 wt % or at least 28 wt % or at least 30 wt %. Still, in one non-limiting embodiment, the mixture may include not greater than 30 wt % of the precursor bond material for a total weight of the mixture, such as not greater than 28 wt % or not greater than 25 wt % or not greater than 22 wt % or not greater than 20 wt % or not greater than 18 wt % or not greater than 15 wt % or not greater than 12 wt % or not greater than 10 wt % or not greater than 8 wt % or not greater than 5 wt % or not greater than 3 wt %. The mixture may include a content of the bond precursor material in an amount within a range including any of the minimum and maximum percentages noted above.

In accordance with another embodiment, the process of forming mixture can include adding a gelling agent to the mixture. The addition of the gelling agent to the mixture may be completed at various times, including for example, prior to the addition of any dry components. The gelling agent may be a material that facilitates changing the mixture into a gel. A gelling agent may be used in combination with gelling processes, including for example, the addition of heat, to facilitate the gelation process.

In accordance with an embodiment the gelling agent may be an organic material, such as a gum. For example, the gelling agent may be selected from the group consisting of agar, agarose, xanthan gum, carboxy methyl cellulose, gellan gum, carrageenan gum, guar gum, tara gum, cellulose gum, locust bean gum, or any combination thereof. According to one particular embodiment, the gelling agent may be preferably a gellan gum.

For certain embodiments, the mixture may include a certain content of the gelling agent to facilitate the formation of an improved abrasive article. For example, the mixture may include at least 0.1 wt % of the gelling agent for a total weight of the mixture, such as at least 0.2 wt % or at least 0.5 wt % or at least 0.8 wt % or at least 1 wt % or at least 1.5 wt % or at least 2 wt % or at least 2.5 wt % or at least 3 wt % or at least 3.5 wt % or at least 4 wt % or at least 4.5 wt % or at least 5 wt % or at least 5.5 wt % or at least 6 wt % or at least 6.5 wt % or at least 7 wt % or at least 7.5 wt %. In one non-limiting examples, the mixture may include not greater than 10 wt % of the gelling agent for a total weight of the mixture, such as not greater than 9 wt % or not greater than 8 wt % or not greater than 7 wt % or not greater than 6 wt % or not greater than 5 wt % or not greater than 4 wt % or not greater than 3 wt % or not greater than 2 wt % or not greater than 1 wt %. The mixture may include a content of the gelling agent in an amount within a range including any of the minimum and maximum percentages noted above.

The mixture may further include abrasive particles configured to form the abrasive component of the final-formed abrasive article. The abrasive particles may be added to the mixture at various times, including for example, after the addition of the bond precursor material to the mixture. Still, it will be appreciated, in other embodiments, the abrasive particles may be added in combination with one or more of the other components in the mixture, including for example, but not limited to the gelling agent, the bond precursor material, or one or more additives. The abrasive particles may include a material such as from the group consisting of oxides, borides, nitrides, carbides, oxynitrides, oxycarbides, amorphous, monocrystalline, polycrystalline, superabrasive or any combination thereof. In one particular embodiment, the abrasive particles can include alumina, and may consist essentially of alumina.

The mixture may include a certain content of abrasive particles to facilitate suitable manufacturing and/or improved performance of the abrasive article. For example, in one embodiment, the mixture may include at least 20 wt % of the abrasive particles for a total weight of the mixture, such as at least 22 wt % or at least 24 wt % or at least 26 wt % or at least 28 wt % or at least 30 wt % or at least 35 wt % or at least 40 wt % or at least 45 wt % or at least 50 wt % or at least 55 wt % or at least 60 wt % or at least 65 wt % or at least 70 wt %. In another non-limiting embodiment, the mixture may include not greater than 80 wt % of the abrasive particles for a total weight of the mixture, such as not greater than 75 wt % or not greater than 70 wt % or not greater than 65 wt % or not greater than 60 wt % or not greater than 55 wt % or not greater than 50 wt % or not greater than 45 wt % or not greater than 40 wt % or not greater than 35 wt % or not greater than 30 wt %, such as not greater than 25 wt %. The mixture may include a content of the abrasive particles in an amount within a range including any of the minimum and maximum percentages noted above.

The mixture may further include one or more additives which may facilitate improved manufacturing and/or performance of the abrasive article. Some exemplary additives may include, but not limited to, dispersants, surfactants, cationic agents, foaming catalyst or any combination thereof. As used herein, a dispersant may prevent flocculation of the mixture by electrostatic or steric repulsion. As used herein, a surfactant may lower the surface tension between two liquids, a solid and liquid or a gas and liquid. As used herein a cationic agent may be an ionic compound (e.g., a salt) that cross-links with the gelling agent, which may be an anionic material. As used herein, a foaming catalyst may be any chemical that is configured to facilitate the decomposition of the foaming agent (e.g., hydrogen peroxide).

The one or more additives may be added to the mixture at various times, including for example, after the addition of the solid components to the mixture, including for example, the bond precursor material and the abrasive particles. Still, it will be appreciated, in other embodiments, the one or more additives may be added in combination with one or more of the other components in the mixture, including for example, but not limited to the foaming agent, the gelling agent, the bond precursor material, or one or more additives. The order the additives are added may also be significant to facilitate suitable formation of the abrasive article. For example, in at least one embodiment, the cationic agent may be added after at least one of the other additives. For certain processes, the cationic agent may be added after the addition of the of the dispersant and/or surfactant. In other instances, the foaming catalyst may be added after the addition of at least one of the additives, such as the dispersant, surfactant and/or cationic agent. In at least one embodiment, the foaming catalyst may be the final component added to the mixture.

Suitable examples of a foaming catalyst can include an inorganic material, such as a solid inorganic material. For example, the foaming catalyst can include an oxide or iodide composition. In one particular embodiment, the foaming catalyst can be potassium iodide, iron oxide, magnesium oxide, copper oxide, or any combination thereof. In certain instances, the foaming catalyst can consist of potassium iodide.

The mixture may include a particular content of foaming catalyst to facilitate improved manufacturing and/or performance of the abrasive article. For example, the mixture can include at least 0.1 wt % of the foaming catalysts for a total weight of the mixture, such as at least 0.2 wt % or at least 0.5 wt % or at least 0.8 wt % or at least 1 wt % or at least 1.5 wt % or at least 2 wt % or at least 2.5 wt % or at least 3 wt % or at least 3.5 wt % or at least 4 wt % or at least 4.5 wt % or at least 5 wt %. In another non-limiting embodiment, the mixture may include not greater than 6 wt % of the foaming catalysts for a total weight of the mixture, such as not greater than 5 wt % or not greater than 4 wt % or not greater than 3 wt % or not greater than 2 wt % or not greater than 1 wt %. The mixture may include a content of the foaming catalysts in an amount within a range including any of the minimum and maximum percentages noted above.

The dispersant can include at least one of sodium polyacrylate (e.g., Darvan 811), copolymer with pigment affinic group (e.g., BYK192), ammonium polymeta acrylate (e.g., Darvan C-N), ammonium polyacrylate (e.g., Darvan 821A), polyacrylic acid, ammonium salt in an acrylic polymer in water (e.g., Dispex), citric acid, sodium dodecylbenzenesulfonate, cetyltrimethyl ammonium bromide or any combination thereof.

The mixture may include a particular content of dispersant to facilitate improved manufacturing and/or performance of the abrasive article. For example, the mixture can include at least 0.1 wt % of the dispersant for a total weight of the mixture, such as at least 0.2 wt % or at least 0.5 wt % or at least 0.8 wt % or at least 1 wt % or at least 1.5 wt % or at least 2 wt % or at least 2.5 wt % or at least 3 wt % or at least 3.5 wt % or at least 4 wt % or at least 4.5 wt % or at least 5 wt %. In another non-limiting embodiment, the mixture may include not greater than 6 wt % of the dispersant for a total weight of the mixture, such as not greater than 5 wt % or not greater than 4 wt % or not greater than 3 wt % or not greater than 2 wt % or not greater than 1 wt %. The mixture may include a content of the dispersant in an amount within a range including any of the minimum and maximum percentages noted above.

Suitable examples of surfactants can include inorganic materials, organic materials or a combination thereof. A suitable surfactant may include a sulfate, a sarconsinate, a laurate, a stearate, lecithin, and the like. In one particular embodiment, the surfactant can include sodium lauroyl sarcosinate, sodium laurel sulfate, sodium laurate, sodium stearate, sodium alkyl sulfate, sodium dodecyl sulfate, sorbitan, polyethylene glycol, polysorbate, glycerol monosterate, egg lecithin or any combination thereof.

The mixture may include a particular content of surfactant that may facilitate improved manufacturing and/or performance of the abrasive article. For example, the mixture can include at least 0.1 wt % of the surfactant for a total weight of the mixture, such as at least 0.2 wt % or at least 0.5 wt % or at least 0.8 wt % or at least 1 wt % or at least 1.5 wt % or at least 2 wt % or at least 2.5 wt % or at least 3 wt % or at least 3.5 wt % or at least 4 wt % or at least 4.5 wt % or at least 5 wt %. In another non-limiting embodiment, the mixture may include not greater than 6 wt % of the surfactant for a total weight of the mixture, such as not greater than 5 wt % or not greater than 4 wt % or not greater than 3 wt % or not greater than 2 wt % or not greater than 1 wt %. The mixture may include a content of the surfactant in an amount within a range including any of the minimum and maximum percentages noted above.

Some suitable examples of cationic agents can include inorganic compounds, particularly salts, such as sulfates, chlorides, chromates, nitrates, carbonates (e.g., bicarbonates), hydrates, and the like. In particular instances, the cationic agent may include a compound including an alkali element, alkali earth element, transition metal element, hydrogen, or a combination thereof. More particularly, the cationic agent may include a compound including sodium, potassium, lithium, ammonium, copper, magnesium, iron, calcium, or any combination thereof. In one particular embodiment, the cationic agent is preferably calcium chloride or sodium chloride. For example, the cationic agent may consist of calcium chloride or sodium chloride.

The cationic agent may be added to the mixture at various times, including for example, after the addition of the solid components (e.g., abrasive particles, one or more fillers, bond precursor mixture) to the mixture. In one particular embodiment, the cationic agent may be the last component added to the slurry prior to gelation. Still, it will be appreciated, in other embodiments, the cationic agent may be added in combination with one or more of the other components in the mixture, including for example, but not limited to the gelling agent, the bond precursor material, abrasive particles or one or more additives.

The mixture may include a particular content of cationic agent that may facilitate improved manufacturing and/or performance of the abrasive article. For example, the mixture can include at least 0.1 wt % of the cationic agent for a total weight of the mixture, such as at least 0.2 wt % or at least 0.5 wt % or at least 0.8 wt % or at least 1 wt % or at least 1.5 wt % or at least 2 wt % or at least 2.5 wt % or at least 3 wt % or at least 3.5 wt % or at least 4 wt % or at least 4.5 wt % or at least 5 wt %. In another non-limiting embodiment, the mixture may include not greater than 6 wt % of the cationic agent for a total weight of the mixture, such as not greater than 5 wt % or not greater than 4 wt % or not greater than 3 wt % or not greater than 2 wt % or not greater than 1 wt %. The mixture may include a content of the cationic agent in an amount within a range including any of the minimum and maximum percentages noted above.

The method of forming mixture may include continuous mixing while the one or more components are added. In particular, mixing may continue throughout the process of adding the components. In certain instances, the components may be added in a particular order, for example the gelling agent may be added first, followed by the addition of the bond precursor material and abrasive particles. One or more of the additives such as the dispersant, surfactant and cationic age may be added before or after the addition of the precursor bond material and/or abrasive particles. In a particular embodiment, the cationic agent can be added prior to the addition of a foaming catalyst. According to one embodiment, the foaming catalyst can be added to the mixture after adding the foaming agent, wherein the foaming catalyst interacts with the foaming agent to create bubbles in the mixture or gel. In certain instances, the foaming agent can be added to the mixture prior to the addition of a gelling agent and the foaming catalyst can be added to the mixture after the addition of the gelling agent.

In at least one embodiment, the method of making the abrasive article includes changing the mixture to a gel. The gelling of the mixture can be facilitated by the addition of one or more of the components, including for example, the gelling agent and/or one or more additives. In accordance with one particular embodiment, the process of forming mixture into a gel can include forming a mixture first including the gel and the carrier, such as water. After forming the mixture including the gel and water, the process may continue by adding at least one of a bond precursor material, abrasive particles, and one or more additives, or any combination thereof. After adding the bond precursor material, abrasive particles, and/or one or more additives to the mixture, the process can continue by adding the cationic agent to the mixture. In particular instances, the cationic agent may be added in the final step of forming the mixture prior to forming the mixture into a gel.

In particular, the process of forming the gel can include heating the mixture to a gelling temperature. More particularly, the mixture can be mixed while heating the mixture to the gelling temperature. In at least one embodiment, the gelling temperature can be at least 50° C., such as at least 60° C. or at least 70° C. or at least 80° C. or at least 90° C. or at least 100° C. Still, in one non-limiting embodiment, the gelling temperature may be not greater than 100° C., such as not greater than 90° C. or not greater than 80° C. or not greater than 70° C. It will be appreciated that the gelling temperature can be within a range including any of the minimum and maximum temperatures noted above.

The process for forming the mixture into the bonded abrasive body can further include a foaming process. The foaming process includes a reaction in the mixture or gel to create bubbles that are entrained in the mixture or gel that are later removed to leave porosity formed in the green body and the final-formed abrasive article. More specifically, the foaming catalyst can be added to the mixture or gel to react with the foaming agent, which may cause decomposition of the foaming agent to release oxygen that form bubbles in the mixture or gel. The foaming process can be conducted on the mixture or on the gel. In a particular embodiment, the foaming process can be completed prior to the gelling process. In another embodiment, the foaming process can be completed after the gelling process and the mixture is changed into a gel. In still another embodiment, the foaming process can be conducted simultaneously with the gelling process. Furthermore, in at least one embodiment, mixing is conducted throughout After forming the gel, which may also be referred to herein as a foamed gel, the process can continue by forming a green body from the gel. In accordance with an embodiment, the process of forming the green body can include at least one process from the group of pressing, molding, casting, drying, freezing, cooling or any combination thereof. In one particular embodiment, the process of forming the green body can include casting. Casting can be completed by pouring the gel into a production tool or cast of a suitable shape and size. During the process of forming the green body, some of the gel may still be forming. That is, gelation need not necessarily be completed during the forming of the green body. Still, in certain instances it may be desirable that the mixture is entirely gelled prior to the process of forming the green body. As used herein, reference to a gel includes a solid self-supporting structure that includes water contained in an integrated network defined by the solid particles in the gel. The gel may have a particular yield stress, such that it is self-supportive. For example, the gel can have a yield stress of at least 30 Pa, such as at least 60 Pa or at least 130 Pa After the green body has been formed, further processes may be conducted on the green body to change or convert the green body into a bonded abrasive body. After completing step 101, the process may continue at step 103 by forming a bonded abrasive body having a certain Solid Phase Variation. For example, one or more processes for converting the green body into the final-formed bonded abrasive body can include drying, sintering, cooling, pressing, vitrifying, or any combination thereof. In one particular embodiment, the process can include casting, cooling, drying and firing. In the context of a vitrified bond material, the firing conditions can be suitable for forming a vitreous bond material. For example, the firing temperature can be at least 800° C. or at least 900° C. or at least 1000° C. or at least 1100° C. or at least 1200° C. Still, in one embodiment, the firing temperature can be not greater than 1400° C. or not greater than 1300° C. or not greater than 1200° C. or not greater than 1100° C. or not greater than 1000° C. or not greater than 900° C.

The final-formed abrasive article may be a bonded abrasive body defining an interconnected network of bond material that contains abrasive particles in the three-dimensional volume (i.e., matrix) of the bond material. Furthermore, the bonded abrasive body may have an amount of porosity distributed throughout the body and defining a phase that is distinct from the phases of the bond material and abrasive particles.

Bonded abrasive bodies formed by the processes of the embodiments herein may have particular features. For example, the bonded abrasive bodies may have relatively high degree of porosity and a high degree of uniformity of the structure throughout the body, which has not previously been achieved in the industry of bonded abrasives. In particular, the bonded abrasive article of an embodiment herein can be a foamed bonded abrasive body. In another aspect, the bonded abrasive body may be essentially free of a pore former or residual pore-forming material.

Figure 2:
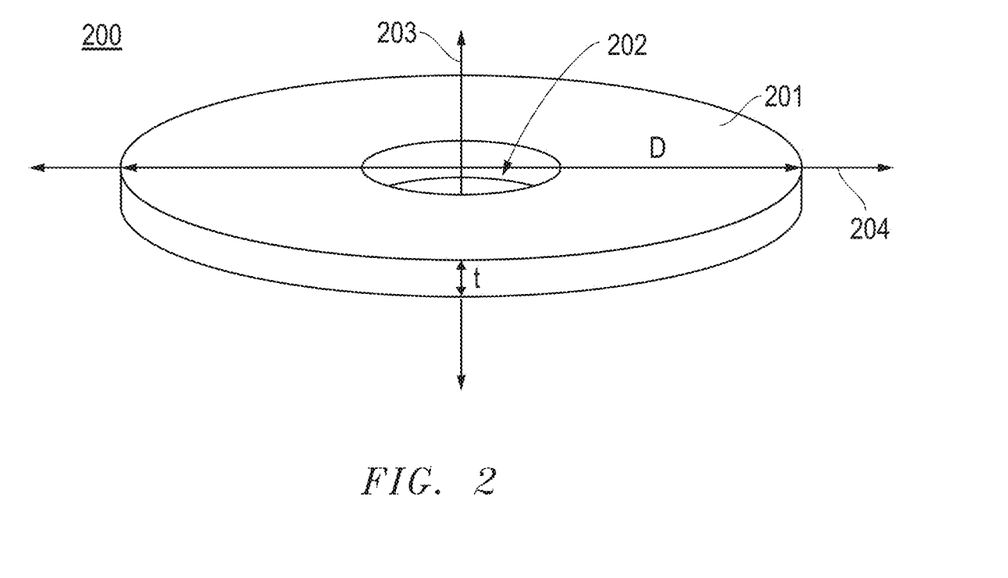
FIG. 2 includes a perspective-view illustration of an abrasive article according to an embodiment.

FIG. 2 includes a perspective view image of a bonded abrasive body in accordance with an embodiment. The abrasive article 200 can include a bonded abrasive body 201. The bonded abrasive body 201 can include an arbor hole 202 configured to engage with a spindle of a grinding machine for rotation of the abrasive article 200 relative to a workpiece. As further illustrated in FIG. 2, the bonded abrasive body includes an axial axis 203 defining an axial direction and a lateral axis 204 defining an axis in a radial direction. The axial axis 203 extends in the vertical direction as defined by a thickness (t) of the bonded abrasive body 201. The lateral axis 204 extends in a radial direction defined by the diameter (D) of the bonded abrasive body 201.

According to one embodiment, the bonded abrasive body 201 may have a diameter (D) of at least 5 mm, such as at least 10 mm or at least 20 mm or at least 50 mm or at least 100 mm or at least 200 mm or at least 300 mm or at least 400 mm or at least 500 mm. Still, in one non-limiting embodiment, the bonded abrasive body may have a diameter (D) of not greater than 800 mm, such as not greater than 700 mm or not greater than 600 m or not greater than 500 mm or not greater than 400 mm or not greater than 300 mm or not greater than 200 mm or not greater than 100 mm or not greater than 80 mm or not greater than 50 mm or not greater than 30 mm. It will be appreciated that the diameter (D) can be within a range including any of the minimum and maximum values noted above. Reference herein to a diameter may be an average diameter of the bonded abrasive body, which is averaged from multiple measurements.

In another embodiment, the bonded abrasive body 201 may have a particular volume depending upon the application. For example, the volume of the bonded abrasive body 201 can be at least 1 cm$^3$. In other instances, the volume of the bonded abrasive body 201 can be at least 10 cm$^3$ or at least 20 cm$^3$ or at least 30 cm$^3$ or at least 50 cm$^3$ or at least 75 cm$^3$ or at least 100 cm$^3$. Still, in another non-limiting embodiment, the body may have a volume of not greater than 1000 cm$^3$ or not greater than 900 cm$^3$ or not greater than 800 cm$^3$ or not greater than 700 cm$^3$ or not greater than 600 cm$^3$ or not greater than 500 cm$^3$. It will be appreciated that the volume of the bonded abrasive body can be within a range including any of the minimum and maximum values noted above, such as a volume of at least 10 cm$^3$ to not greater than 1000 cm$^3$.

In still another embodiment, the bonded abrasive body 201 may have a particular thickness (t) configured for use in certain applications. For example, the bonded abrasive body 201 can have a thickness the body comprises a thickness of at least 2 mm, such as at least 3 mm or at least 4 mm or at least 5 mm or at least 10 mm or at least 15 mm or at least 20 mm or at least 30 mm or at least 50 mm or at least 100 mm or at least 200 mm or at least 300 mm. Still, in another embodiment, the thickness (t) of the bonded abrasive body 201 can be not greater than 500 mm, such as not greater than 400 mm or at least 300 mm or not greater than 200 mm or not greater than 100 mm or not greater than 80 mm or not greater than 60 mm or not greater than 40 mm or not greater than 20 mm or not greater than 10 mm. It will be appreciated that the thickness (t) of the bonded abrasive body 201 can be within a range including any of the minimum and maximum values noted above, such as a volume of at least 2 mm to not greater than 400 mm. Reference herein to a thickness may be an average thickness of the bonded abrasive body, which is averaged from multiple measurements.

The bonded abrasive body 201 may have a particular aspect ratio (D:t) of at least 1:1, such as at least 2:1 or at least 3:1 or at least 4:1 or at least 5:1, such as at least 10:1 or at least 20:1 or at least 40:1 or at least 50:1 or at least 100:1 or at least 150:1 or at least 300:1 or at least 500:1 or at least 800:1 or at least 1000:1. Still, in another non-limiting embodiment, the aspect ratio (D:t) may be not greater than 100,000:1 or not greater than 10,000:1 or not greater than 1000:1 or not greater than 500:1 or not greater than 200:1 or not greater than 100:1 or not greater than 50:1. It will be appreciated that the aspect ratio can be within a range including any of the minimum to maximum ratios noted above.

The bonded abrasive body 201 may include abrasive particles having an average particle size (D50) of at least 0.5 microns, such as at least 1 micron or at least 5 microns or at least 10 microns or at least 20 microns or at least 50 microns or at least 100 microns or at least 200 microns or at least 300 microns or at least 400 microns or at least 500 microns or at least 800 microns or at least 1000 microns. In another embodiment, the abrasive particles may have an average particle size (D50) of not greater than 5000 microns, such as not greater than 4000 microns or not greater than 3000 microns or not greater than 2000 microns or not greater than 1000 microns or not greater than 900 microns or not greater than 800 microns or not greater than 700 microns or not greater than 600 microns or not greater than 500 microns or not greater than 400 microns or not greater than 300 microns or not greater than 200 microns or not greater than 150 microns or not greater than 100 microns or not greater than 50 microns or not greater than 20 microns or not greater than 10 microns. The abrasive particles may have an average particle size (D50) within a range including any of the minimum and maximum values noted above. In certain instances, the bonded abrasive bodies herein may utilize relatively large size abrasive particles, which have historically proven difficult to homogeneously distribute throughout the mixture and resulting bonded abrasive body. The impact of settling may be even more significant when attempting to form abrasive bodies having a high degree of porosity. Notably, due to their relatively larger sizes, such abrasive particles have a tendency to segregate and agglomerate in the gel and mixture, resulting in abrasive products with in homogeneities and density variations. In one particular embodiment, the abrasive particles can have an average particle size (D50) within a range of at least 40 microns to not greater than 5000 microns or within a range of at least 100 micros to not greater than 3000 microns or within a range of at least 200 microns to not greater than 3000 microns or even within a range of at least 50 microns to not greater than 400 microns.

The abrasive particles may have various compositions, shapes, sizes, and other features. For example, the abrasive particles may include an abrasive particle type such as from the group of claimed unagglomerated particles, agglomerated particles, shaped abrasive particles, shaped abrasive composites, constant thickness abrasive particles (CTAP), randomly shaped abrasive particles, or any combination thereof. In another embodiment, the abrasive particles may include a material such as from the group of oxides, borides, nitrides, carbides, oxynitrides, oxycarbides, amorphous, monocrystalline, polycrystalline, superabrasive or any combination thereof. According to one embodiment, the abrasive particles can include unagglomerated and randomly shaped particles comprising alumina, and more particularly, consisting essentially of alumina.

In accordance with one embodiment, the bonded abrasive body 201 may have a particular structure that may facilitate improved performance. For example, the bonded abrasive body 201 may include a content of abrasive particles of at least 1 vol % for a total volume of the bonded abrasive body 201, such as at least 2 vol % or at least 3 vol % or at least 5 vol % or at least 7 vol % or at least 10 vol % or at least 15 vol % or at least 20 vol % or at least 25 vol % or at least 30 vol %. Still, in one non-limiting embodiment, the bonded abrasive body 201 may include a content of abrasive particles of not greater than 40 vol % for a total volume of the bonded abrasive body, such as not greater than 35 vol % or not greater than 30 vol % or not greater than 25 vol % or not greater than 20 vol % or not greater than 15 vol % or not greater than 12 vol % or not greater than 10 vol %. The content of abrasive particles in the bonded abrasive body 201 can be within a range including any of the minimum and maximum percentages noted above.

In one particular aspect, the bonded abrasive body 201 can include a bond material including an inorganic material. Some suitable examples of an inorganic material can include a metal, metal alloy, ceramic, vitreous phase, or any combination thereof. Furthermore, the bond material may include at least one of a vitreous phase, amorphous phase, a polycrystalline phase, a monocrystalline phase, or any combination thereof. In certain instances, the bond material can consist essentially of a polycrystalline phase, a vitreous phase, or a monocrystalline phase.

For at least one embodiment, the bond material may include an oxide, such as a vitreous oxide-containing material. Some suitable examples of oxides can include silicon dioxide, boron oxide, aluminum oxide, alkali oxide ($M_2O$), alkaline earth oxide (MO) transition metal oxide, rare earth metal oxide, or any combination thereof. In particular instances, the bond material may be a soda-lime vitreous material, borosilicate material, or aluminosilicate material.

The bonded abrasive body 201 may include a particular content of bond material that may facilitate improved performance. For example, the bonded abrasive body 201 may include a content of bond material of at least 1 vol % for a total volume of the bonded abrasive body or at least 2 vol % or at least 3 vol % or at least 4 vol % or at least 5 vol % or at least 6 vol % or at least 8 vol % or at least 10 vol % or at least 12 vol % or at least 14 vol % or at least 16 vol % or at least 18 vol % or at least 20 vol % or at least 25 vol % or at least 30 vol % or at least 35 vol % or at least 40 vol %. Still, in one non-limiting embodiment, the bonded abrasive body 201 can include a content of bond material of not greater than 65 vol % for a total volume of the bonded abrasive body, such as not greater than 60 vol % or not greater than 55 vol % or not greater than 50 vol % or not greater than 45 vol % or not greater than 40 vol % or not greater than 35 vol % or not greater than 30 vol % or not greater than 25 vol % or not greater than 22 vol % or not greater than 20 vol % or not greater than 18 vol % or not greater than 16 vol % or not greater than 14 vol % or not greater than 12 vol % or not greater than 10 vol % or not greater than 8 vol % or not greater than 6 vol % or not greater than 4 vol %. It will be appreciated that the content of bond material can be within a range including any of the minimum and maximum values noted above.

The bonded abrasive body 201 may include a particular structure such that it has a controlled content of the bond material relative to the content of abrasive particles. For example, in one instance, the body can have an ABR Factor (Cb/Cap) within a range of at least 0.1 to not greater than 10, wherein Cb represents the vol % of the bond material for the total volume of the bonded abrasive body 201 and Cap represents the vol % of the abrasive particles for the total volume of the bonded abrasive body 201. In particular instances, the bonded abrasive body 201 may have an ABR Factor (Cb/Cap) of at least 0.3 or at least 0.4 or at least 0.5 or at least 0.6 or at least 0.7 or at least 0.8 or at least 0.9 or at least 1 or at least 1.5 or at least 2 or at least 2.5 or at least 3 or at least 3.5 or at least 4 or at least 4.5 or at least 5 or at least 5.5 or at least 6 or at least 7 or at least 8 or at least 9. Still, in another non-limiting embodiment, the bonded abrasive body 201 can have an ABR Factor (Cb/Cap) of not greater than 10, such as not greater than 9 or not greater than 8.5 or not greater than 8 or not greater than 7.5 or not greater than 7 or not greater than 6.5 or not greater than 6 or not greater than 5.5 or not greater than 5 or not greater than 4.5 or not greater than 4 or not greater than 3.5 or not greater than 3 or not greater than 2.5 or not greater than 2 or not greater than 1.5 or not greater than 1 or not greater than 0.5. It will be appreciated that the ABR Factor (Cb/Cap) can be within a range including any of the minimum and maximum values noted above.

In another embodiment, the bond abrasive body 201 may have a particular type and content of porosity that may facilitate improved performance of the abrasive article. For example, the bonded abrasive body 201 can have an average pore size of at least 10 microns, such as at least 20 microns or at least 30 microns or at least 40 microns or at least 50 microns or at least 60 microns or at least 70 microns or at least 80 microns or at least 90 microns or at least 100 microns or at least 200 microns or at least 300 microns or at least 400 microns or at least 500 microns or at least 600 microns or at least 700 microns or at least 800 microns or at least 900 microns. Still, in one non-limiting embodiment, the average pore size of the porosity of the bonded abrasive body 201 can be not greater than 1000 microns or not greater than 900 microns or not greater than 800 microns or not greater than 700 microns or not greater than 600 microns or not greater than 500 microns or not greater than 400 microns or not greater than 300 microns or not greater than 200 microns or not greater than 100 microns or not greater than 80 microns or not greater than 60 microns or not greater than 40 microns or not greater than 20 microns or not greater than 10 microns. It will be appreciated that the average pore size can be within a range including any of the minimum and maximum values noted above.

The bonded abrasive body 201 may have a particular content of porosity that may facilitate improved performance. For example, the bonded abrasive body 201 may include at least 55 vol % porosity for a total volume of the bonded abrasive body 201, such as at least 58 vol % or at least 60 vol % or at least 62 vol % or at least 64 vol % or at least 66 vol % or at least 68 vol % or at least 69 vol % or at least 70 vol % or at least 72 vol % or at least 74 vol % or at least 76 vol % or at least 78 vol % or at least 80 vol % or at least 82 vol % or at least 84 vol % or at least 86 vol % or at least 88 vol % or at least 90 vol %. Still, in one non-limiting embodiment, the bonded abrasive body 201 can include not greater than 95 vol % or not greater than 92 vol % or not greater than 90 vol % or not greater than 88 vol % for a total volume of the bonded abrasive body or not greater than 86 vol % or not greater than 84 vol % or not greater than 82 vol % or not greater than 80 vol % or not greater than 78 vol % or not greater than 76 vol % or not greater than 74 vol % or not greater than 72 vol % or not greater than 70 vol %. It will be appreciated that the content of porosity in the bonded abrasive body 201 can be within a range including any of the minimum and maximum percentages noted above, such as within a range of at least 60 vol % and not greater than 90 vol % for a total volume of the bonded abrasive body or within a range of at least 70 vol % and not greater than 90 vol % for a total volume of the bonded abrasive body or within a range of at least 70 vol % and not greater than 85 vol % for a total volume of the bonded abrasive body.

The porosity of the bonded abrasive body 201 may include open porosity, closed porosity, or a combination thereof. Open porosity can be defined as interconnected channels extending through the bonded abrasive body 201. Closed porosity can define discrete and isolated voids contained in the bond material. In accordance with an embodiment, In accordance with an embodiment, the bonded abrasive body 201 may include a particular content of open porosity that may facilitate improved performance. For example, the bonded abrasive body 201 may include at least 10 vol % open porosity for a total content of the porosity in the bonded abrasive body, such as at least 15 vol % or at least 20 vol % or at least 30 vol % or at least 40 vol % or at least 50 vol % or at least 60 vol % or at least 70 vol % or at least 80 vol % or at least 90 vol %. Still, in one non-limiting embodiment, the bonded abrasive body 201 can include not greater than 95 vol % open porosity for a total volume of the porosity in the bonded abrasive body 201, such as not greater than 90 vol % or not greater than 80 vol % or not greater than 70 vol % or not greater than 60 vol %. In at least one embodiment, all of the porosity in the bonded abrasive body 201 can be open porosity. It will be appreciated that the content of open porosity can be within a range including any of the minimum and maximum percentages noted above In accordance with an embodiment, the bonded abrasive body 201 may include a particular content of closed porosity that may facilitate improved performance. For example, the bonded abrasive body 201 may include at least 1 vol % closed porosity for a total content of the porosity in the bonded abrasive body, such as at least 2 vol % or at least 4 vol % or at least 6 vol % or at least 8 vol % or at least 10 vol % or at least 15 vol % or at least 20 vol % or at least 30 vol % or at least 40 vol %. Still, in one non-limiting embodiment, the bonded abrasive body 201 can include not greater than 50 vol % closed porosity for a total content of the porosity in the bonded abrasive body, such as not greater than 40 vol % or not greater than 30 vol % or not greater than 20 vol % or not greater than 15 vol % or not greater than 10 vol % or not greater than 8 vol % or not greater than 6 vol % or not greater than 4 vol %. In at least one embodiment, the bonded abrasive body 201 can be free of closed porosity. It will be appreciated that the content of closed porosity can be within a range including any of the minimum and maximum percentages noted above.

In accordance with an embodiment, the bonded abrasive body 201 may have a particular pore size distribution as achieved by the forming processes disclosed herein and that may facilitate improved performance. For example, the porosity on the bonded abrasive body 201 can have a D90 pore size of at least of at least 20 microns or at least 30 microns or at least 40 microns or at least 50 microns or at least 60 microns or at least 70 microns or at least 80 microns or at least 90 microns or at least 100 microns or at least 200 microns or at least 300 microns or at least 400 microns or at least 500 microns or at least 600 microns or at least 700 microns or at least 800 microns or at least 900 microns. Still, in one non-limiting embodiment, the D90 pore size of the bonded abrasive body 201 can be not greater than 2000 microns or not greater than 1500 microns or not greater than 1000 microns or not greater than 900 microns or not greater than 800 microns or not greater than 700 microns or not greater than 600 microns or not greater than 500 microns or not greater than 400 microns or not greater than 300 microns or not greater than 200 microns or not greater than 100 microns or not greater than 80 microns or not greater than 60 microns or not greater than 40 microns. It will be appreciated that the D90 pore size can be within a range including any of the minimum and maximum values noted above. As used herein, a D90 pore size defines the size of the pores at the 90% percentile of the pore size distribution. Stated alternatively it is the pore size at which only 9% of the pores have a larger pore size.

In another aspect, the porosity on the bonded abrasive body 201 can have a D10 pore size of at least of at least 0.01 microns or at least 0.1 microns or at least 1 micron or at least 10 microns or at least 20 microns or at least or at least 30 microns or at least 40 microns or at least 50 microns or at least 60 microns or at least 70 microns or at least 80 microns or at least 90 microns or at least 100 microns or at least 200 microns or at least 300 microns or at least 400 microns or at least 500 microns or at least 600 microns or at least 700 microns or at least 800 microns or at least 900 microns. Still, in one non-limiting embodiment, the D10 pore size of the bonded abrasive body 201 can be not greater than 900 microns or not greater than 800 microns or not greater than 700 microns or not greater than 600 microns or not greater than 500 microns or not greater than 400 microns or not greater than 300 microns or not greater than 200 microns or not greater than 100 microns or not greater than 80 microns or not greater than 60 microns or not greater than 40 microns or not greater than 30 microns or not greater than 20 microns or not greater than 10 microns or not greater than 1 micron or not greater than 0.1 microns. It will be appreciated that the D10 pore size can be within a range including any of the minimum and maximum values noted above. As used herein, a D10 pore size defines the size of the pores at the 10% percentile of the pore size distribution. Stated alternatively it is the pore size at which only 9% of the pores have a smaller pore size.

The bonded abrasive body 201 can have a particular microstructure based on the methods of making according to embodiments herein. For example, the bonded abrasive body 201 can have a permeability as defined by Darcy's number of at least 350 or at least 360 or at least 370 or at least 380 or at least 390 or at least 400 or at least 410 or at least 420 or at least 430 or at least 440 or at least 450 or at least 475 or at least 500. Still, in one non-limiting embodiment the permeability can be defined by a Darcy's number of not greater than 1000 or not greater than 900 or not greater than 800 or not greater than 700 or not greater than 600. The permeability can be measured according to ASTM D4525-13e2.

The processes of the embodiments herein may facilitate formation of bonded abrasive articles having particular grades and/or structures utilizing relatively large abrasive particles and having a superior homogeneity in terms of the distribution of phases throughout the body in a manner that it was not previously achieved by conventional processing. Notably, the bonded abrasive body 201 may have a Solid Phase Variation of not greater than 45%. A low Solid Phase Variation indicates a superior homogeneity of the bonded abrasive body compared to other high porosity bonded abrasives made through other processes. Notably, the controlled reaction and timing of gelling and foaming facilitates the superior homogenous distribution of the phases throughout the bonded abrasive, which appears to facilitate improved operations of the bonded abrasives formed according to the embodiments herein. In one embodiment, the Solid Phase Variation is not greater than 38%, such as not greater than 36% or not greater than 34% or not greater than 32% or not greater than 30% or not greater than 38% or not greater than 36% or not greater than 34% or not greater than 32% or not greater than 30% or not greater than 28% or not greater than 26% or not greater than 24% or not greater than 22% or not greater than 20% or not greater than 18% or not greater than 16% or not greater than 14% or not greater than 12% or not greater than 10% or not greater than 8% or not greater than 7% or not greater than 6% or not greater than 5% or not greater than 4% or not greater than 3% or not greater than 2%. Still, in another non-limiting embodiment, the Solid Phase Variation can be at least 1% or at least 2% or at least 3% or at least 4% or at least 5% or at least 6% or at least 7% or at least 8% or at least 9% or at least 10% or at least 12% or at least 14% or at least 16% or at least 18% or at least 20% or at least 22% or at least 24% or at least 25% or at least 26% at least 28% or at least 30%. It will be appreciated that the Solid Phase Variation can be within a range including any of the minimum and maximum percentages noted above.

The Solid Phase Variation is evaluated using a computed tomography (CT) scan via X-rays. To evaluate the Solid Phase Variation of a bonded abrasive body, multiple random samples are cut from a bonded abrasive product at various locations. It is preferable that each sample or series of samples accounts for the entire thickness of the bonded abrasive body so that one can evaluate the difference in solid phase content across the entire thickness of the body. For example, a single sample can be taken from the bonded abrasive body that accounts for the entire thickness of the body. Another method includes taking multiple cuts from the wheel at the same location to get multiple samples that account for the entire thickness of the bonded abrasive body.

The sample or samples are marked and then scanned using X-rays for evaluation by computed tomography. The evaluations herein were conducted using an X-ray machine available as GE Phoenix V—tome xs225. On the opposite side of the sample from the X-ray machine an image intensifier or detector is positioned. The detector is commercially available as Dynamic 41-100 from GE Digital Solutions. The detector is coupled to a computer system for sending analog video signals to the computer. The system also includes a tunable interface unit that is connected to the computer controlled turntable holding the sample. The tunable interface unit is also connected to the computer.

Figure 3:
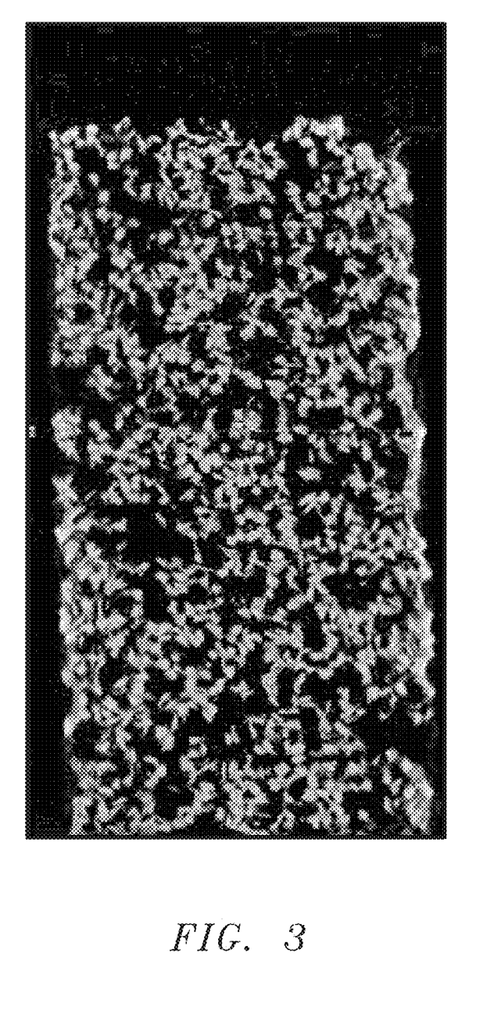
FIG. 3 includes a representative image of an original CT scan image.
Figure 4:
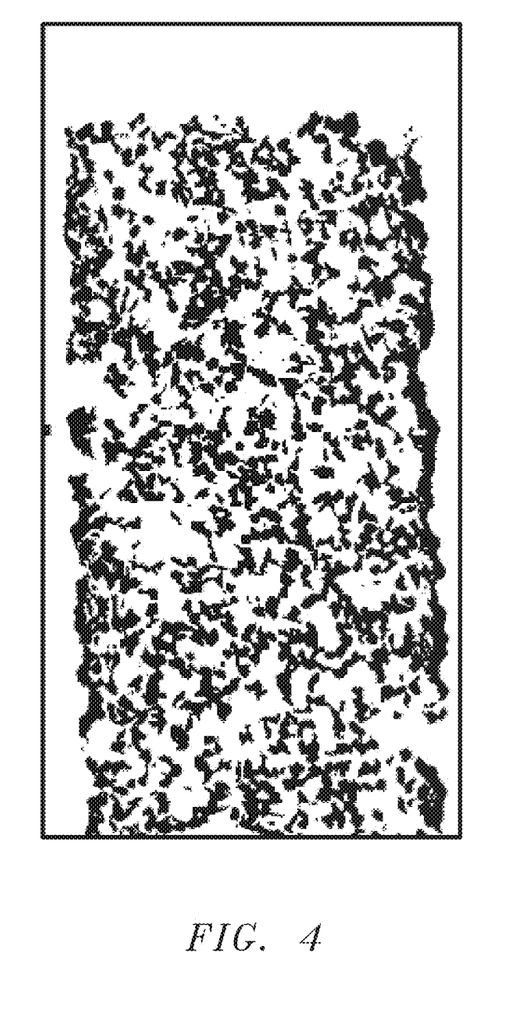
FIG. 4 includes a representative 8 bit black and white image of the image of FIG. 3.
Figure 5:
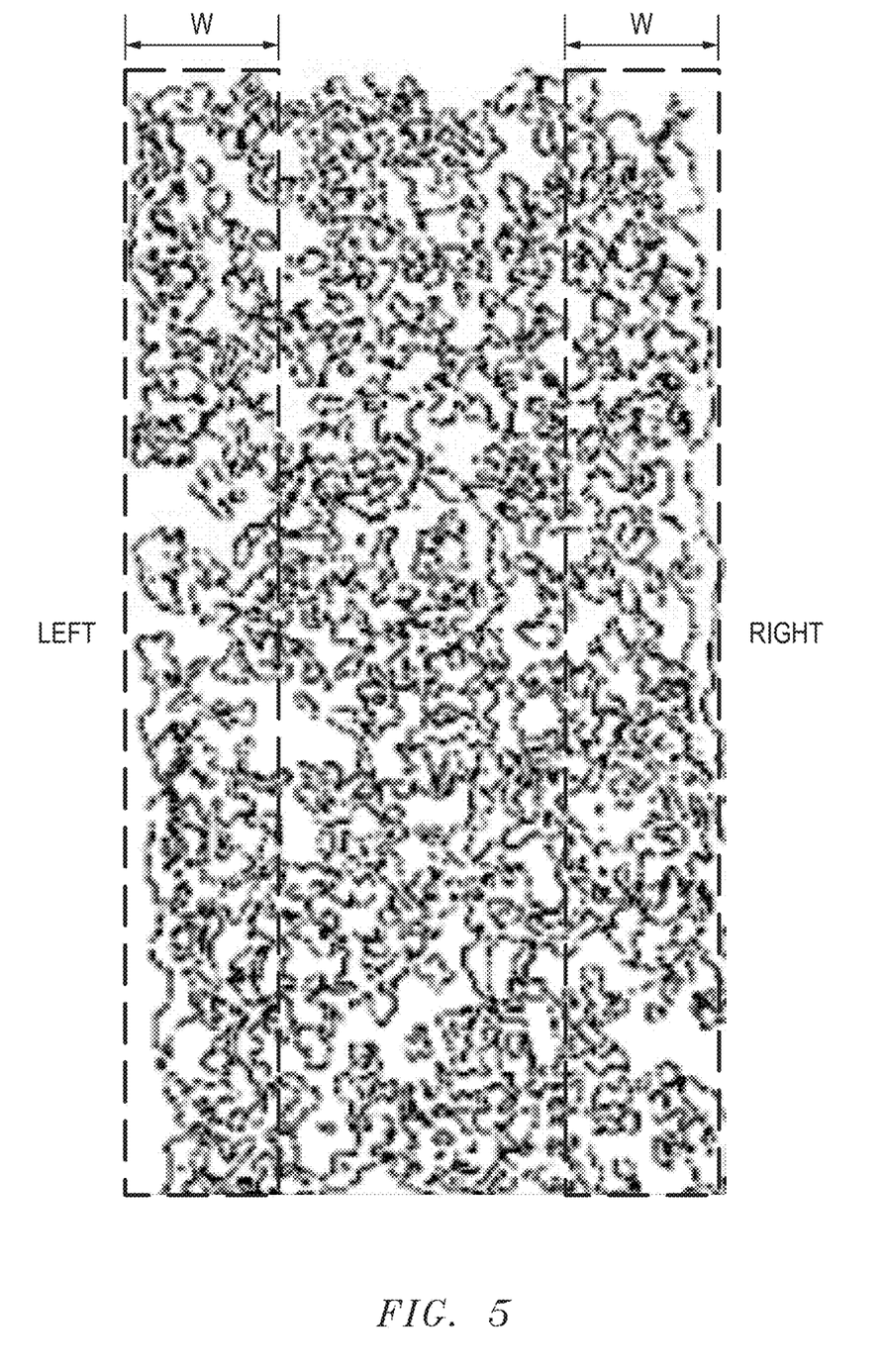
FIG. 5 includes an image of FIG. 4 after conducting an "outline" function.

The raw data from the X-ray scanning process is sent to the computer and an image is created based on tomographic reconstruction using Phoenix datosx CT software. FIG. 3 includes a representative image of an original CT scan image. Note that if multiple samples are used, they can be cut and pasted together to generate a composite CT scan image that is representative of the microstructure throughout the thickness of the body. The original CT scan image is then modified to an 8-bit black and white image using suitable image analysis software, such as ImageJ. ImageJ uses an Otsu's method for creating the black and white image from the original CT scan image. FIG. 4 includes a representative 8 bit black and white image of the image of FIG. 3. The black and white image is then modified using an "outline" function in ImageJ to create an outline image of the solid phase material (i.e., black) in the black and white image. FIG. 5 includes an image of FIG. 4 after conducting an "outline" function.

Under the analysis feature in ImageJ the "set scale" function is used to correlate the number of pixels in the image to an actual distance (e.g., microns). This function is then used to select a box as shown in FIG. 5, wherein the box has a width (W) equivalent to twice the average particle size of particles used in the bonded abrasive body. For example, if the D50 of the abrasive particles in the body is 50 microns, the width (W) of the box is 100 microns. As illustrated, a box is drawn on both sides of the image to evaluate the homogeneity of the solid material on both sides of the image. Note that both boxes are drawn such that one side intersects the upper surface of the body and extends into the depth of the body for the predetermined distance according to 2× the D50 as noted herein.

Figure 6:
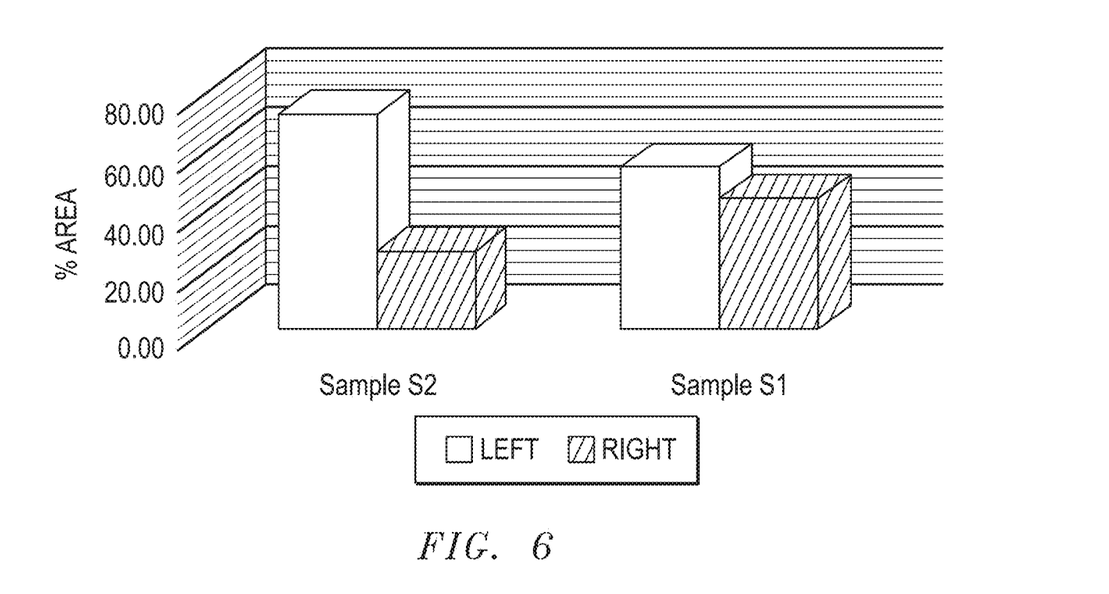
FIG. 6 includes a plot of percent area from left and right portions of samples analyzed in the Examples.

After selecting the appropriate area of the outline image by drawing a box, the area in the box is analyzed according to the "analyze particles" function in the ImageJ software. The "analyze particles" function counts the number of solid phase regions in the selected area and produces a set of data. This data is used to create a plot of percent area versus location as illustrated in FIG. 6. The difference in the percent area between the left and right sides of the images is the Solid Phase Variation. For example, if the percent area of solid material on the right side is 80% and the percent area of the solid material on the left side is 40%, the Solid Phase Variation is 40% (i.e., 80%-40%=40%).

Many different aspects and embodiments are possible. Some of those aspects and embodiments are described herein. After reading this specification, skilled artisans will appreciate that those aspects and embodiments are only illustrative and do not limit the scope of the present invention. Embodiments may be in accordance with any one or more of the embodiments as listed below.

Embodiments

Embodiment 1. An abrasive article comprising:
a bonded abrasive body comprising:
a bond material comprising an inorganic material;
abrasive particles contained within the bonded abrasive body;
porosity within a range of at least 55 vol % to not greater than 90 vol % for a total volume of the bonded abrasive body; and
a Solid Phase Variation of not greater than 45%.

Embodiment 2. The abrasive article of embodiment 1, wherein the Solid Phase Variation is not greater than 38% or not greater than 36% or not greater than 34% or not greater than 32% or not greater than 30% or not greater than 38% or not greater than 36% or not greater than 34% or not greater than 32% or not greater than 30% or not greater than 28% or not greater than 26% or not greater than 24% or not greater than 22% or not greater than 20% or not greater than 18% or not greater than 16% or not greater than 14% or not greater than 12% or not greater than 10% or not greater than 8% or not greater than 7% or not greater than 6% or not greater than 5% or not greater than 4% or not greater than 3% or not greater than 2%.

Embodiment 3. The abrasive article of embodiment 1, wherein the Solid Phase Variation is at least 1% or at least 2% or at least 3% or at least 4% or at least 5% or at least 6% or at least 7% or at least 8% or at least 9% or at least 10% or at least 12% or at least 14% or at least 16% or at least 18% or at least 20% or at least 22% or at least 24% or at least 25% or at least 26% at least 28% or at least 30%.

Embodiment 4. The abrasive article of embodiment 1, wherein the bonded abrasive body comprises a porosity of at least 58 vol % for a total volume of the bonded abrasive body or at least 60 vol % or at least 62 vol % or at least 64 vol % or at least 66 vol % or at least 68 vol % or at least 69 vol % or at least 70 vol % or at least 72 vol % or at least 74 vol % or at least 76 vol % or at least 78 vol % or at least 80 vol % or at least 82 vol % or at least 84 vol % or at least 86 vol % or at least 88 vol % or at least 90 vol %.

Embodiment 5. The abrasive article of embodiment 1, wherein the bonded abrasive body comprises a porosity of not greater than 95 vol % for a total volume of the bonded abrasive body or not greater than 92 vol % or not greater than 90 vol % or not greater than 88 vol % or not greater than 86 vol % or not greater than 84 vol % or not greater than 82 vol % or not greater than 80 vol % or not greater than 78 vol % or not greater than 76 vol % or not greater than 74 vol % or not greater than 72 vol % or not greater than 70 vol %.

Embodiment 6. The abrasive article of embodiment 1, wherein the bonded abrasive body comprises a porosity within a range of at least 60 vol % and not greater than 90 vol % for a total volume of the bonded abrasive body or within a range of at least 70 vol % and not greater than 90 vol % for a total volume of the bonded abrasive body or within a range of at least 70 vol % and not greater than 85 vol % for a total volume of the bonded abrasive body.

Embodiment 7. The abrasive article of embodiment 1, wherein at least a portion of the total porosity is open porosity, wherein the open porosity defines interconnected channels extending through the bonded abrasive body.

Embodiment 8. The abrasive article of embodiment 7, wherein the bonded abrasive body comprises at least 10 vol % open porosity for a total content of the porosity in the bonded abrasive body or at least 15 vol % or at least 20 vol % or at least 30 vol % or at least 40 vol % or at least 50 vol % or at least 60 vol % or at least 70 vol % or at least 80 vol % or at least 90 vol % or wherein essentially all of the porosity is open porosity.

Embodiment 9. The abrasive article of embodiment 7, wherein the bonded abrasive body comprises not greater than 95 vol % open porosity for a total content of the porosity in the bonded abrasive body or not greater than 90 vol % or not greater than 80 vol % or not greater than 70 vol % or not greater than 60 vol %.

Embodiment 10. The abrasive article of embodiment 1, wherein at least a portion of the total porosity is closed porosity, wherein the closed porosity defines discrete and isolated voids contained in the bond material.

Embodiment 11. The abrasive article of embodiment 10, wherein the bonded abrasive body comprises at least 1 vol % closed porosity for a total content of the porosity in the bonded abrasive body or at least 2 vol % or at least 4 vol % or at least 6 vol % or at least 8 vol % or at least 10 vol % or at least 15 vol % or at least 20 vol % or at least 30 vol % or at least 40 vol %.

Embodiment 12. The abrasive article of embodiment 10, wherein the bonded abrasive body comprises not greater than 50 vol % closed porosity for a total content of the porosity in the bonded abrasive body or not greater than 40 vol % or not greater than 30 vol % or not greater than 20 vol % or not greater than 15 vol % or not greater than 10 vol % or not greater than 8 vol % or not greater than 6 vol % or not greater than 4 vol %.

Embodiment 13. The abrasive article of embodiment 1, wherein the bonded abrasive body is free of closed porosity.

Embodiment 14. The abrasive article of embodiment 1, wherein the bonded abrasive body is a foamed body.

Embodiment 15. The abrasive article of embodiment 1, wherein the bonded abrasive body is essentially free of a pore former.

Embodiment 16. The abrasive article of embodiment 1, wherein the porosity comprises an average pore size (D50) of at least 10 microns and not greater than 1000 microns.

Embodiment 17. The abrasive article of embodiment 1, wherein the porosity comprises a D90 pore size of at least 20 microns and not greater than 2000 microns.

Embodiment 18. The abrasive article of embodiment 1, wherein the porosity comprises a D10 pore size of at least 0.1 microns and not greater than 900 microns.

Embodiment 19. The abrasive article of embodiment 1, wherein the abrasive particles have an average particle size (D50) of not greater than 5000 microns or not greater than 4000 microns or not greater than 3000 microns or not greater than 2000 microns or not greater than 1000 microns or not greater than 900 microns or not greater than 800 microns or not greater than 700 microns or not greater than 600 microns or not greater than 500 microns or not greater than 400 microns or not greater than 300 microns or not greater than 200 microns or not greater than 150 microns or not greater than 100 microns or not greater than 50 microns or not greater than 20 microns or not greater than 10 microns.

Embodiment 20. The abrasive article of embodiment 1, wherein the abrasive particles have an average particle size (D50) of at least 0.5 microns or at least 1 micron or at least 5 microns or at least 10 microns or at least 20 microns or at least 50 microns or at least 100 microns or at least 200 microns or at least 300 microns or at least 400 microns or at least 500 microns or at least 800 microns or at least 1000 microns.

Embodiment 21. The abrasive article of embodiment 1, wherein the abrasive particles comprise an abrasive particle type selected from the group consisting of unagglomerated particles, agglomerated particles, shaped abrasive particles, shaped abrasive composites, constant thickness abrasive particles (CTAP), randomly shaped abrasive particles, or any combination thereof.

Embodiment 22. The abrasive article of embodiment 1, wherein the abrasive particles comprise a material selected from the group consisting of oxides, borides, nitrides, carbides, oxynitrides, oxycarbides, amorphous, monocrystalline, polycrystalline, superabrasive or any combination thereof.

Embodiment 23. The abrasive article of embodiment 1, wherein the bonded abrasive body comprises a content of abrasive particles of at least 1 vol % for a total volume of the bonded abrasive body or at least 2 vol % or at least 3 vol % or at least 5 vol % or at least 7 vol % or at least 10 vol % or at least 15 vol % or at least 20 vol % or at least 25 vol % or at least 30 vol %.

Embodiment 24. The abrasive article of embodiment 1, wherein the bonded abrasive body comprises a content of abrasive particles of not greater than 40 vol % for a total volume of the bonded abrasive body or not greater than 35 vol % or not greater than 30 vol % or not greater than 25 vol % or not greater than 20 vol % or not greater than 15 vol % or not greater than 12 vol % or not greater than 10 vol %.

Embodiment 25. The abrasive article of embodiment 1, wherein the abrasive particles are essentially unagglomerated.

Embodiment 26. The abrasive article of embodiment 1, wherein the bonded abrasive body comprises a content of bond material of at least 1 vol % for a total volume of the bonded abrasive body or at least 2 vol % or at least 3 vol % or at least 4 vol % or at least 5 vol % or at least 6 vol % or at least 8 vol % or at least 10 vol % or at least 12 vol % or at least 14 vol % or at least 16 vol % or at least 18 vol % or at least 20 vol % or at least 25 vol % or at least 30 vol % or at least 35 vol % or at least 40 vol %.

Embodiment 27. The abrasive article of embodiment 1, wherein the bonded abrasive body comprises a content of bond material of not greater than 65 vol % for a total volume of the bonded abrasive body or not greater than 60 vol % or not greater than 55 vol % or not greater than 50 vol % or not greater than 45 vol % or not greater than 40 vol % or not greater than 35 vol % or not greater than 30 vol % or not greater than 25 vol % or not greater than 22 vol % or not greater than 20 vol % or not greater than 18 vol % or not greater than 16 vol % or not greater than 14 vol % or not greater than 12 vol % or not greater than 10 vol % or not greater than 8 vol % or not greater than 6 vol % or not greater than 4 vol %.

Embodiment 28. The abrasive article of embodiment 1, wherein the bond material is selected from the group consisting of ceramic, vitreous, metal, metal alloy or any combination thereof.

Embodiment 29. The abrasive article of embodiment 1, wherein the bond material comprises a polycrystalline phase, an amorphous phase, a monocrystalline phase, or any combination thereof.

Embodiment 30. The abrasive article of embodiment 1, wherein the bond material consists essentially of a polycrystalline phase, a vitreous phase, or a monocrystalline phase.

Embodiment 31. The abrasive article of embodiment 1, wherein the bond material comprises an oxide.

Embodiment 32. The abrasive article of embodiment 1, wherein the bond material comprises at least one composition selected from the group consisting of silicon dioxide ($SiO_2$), boron oxide ($B_2O_3$), aluminum oxide ($Al_2O_3$), alkai oxide ($M_2O$), alkaline earth oxide (MO) transition metal oxide, rare earth metal oxide, or any combination thereof.

Embodiment 33. The abrasive article of embodiment 1, wherein the bond material comprises a metal or metal alloy including a material selected from the group consisting of copper, tin, silver, molybdenum, zinc, tungsten, iron, nickel, antimony, and a combination thereof.

Embodiment 34. The abrasive article of embodiment 1, wherein the bond material comprises a metal alloy including copper and tin.

Embodiment 35. The abrasive article of embodiment 1, the bond material comprises at least one of a soda lime silicate, borosilicate, or aluminosilicate material.

Embodiment 36. The abrasive article of embodiment 1, wherein the bonded abrasive body comprises an ABR Factor (Cb/Cap) of at least 0.1, wherein Cb represents the vol % of the bond material for the total volume of the bonded abrasive body and Cap represents the vol % of the abrasive particles for the total volume of the bonded abrasive body, or wherein the ABR Factor is at least 0.3 or at least 0.4 or at least 0.5 or at least 0.6 or at least 0.7 or at least 0.8 or at least 0.9 or at least 1 or at least 1.5 or at least 2 or at least 2.5 or at least 3 or at least 3.5 or at least 4 or at least 4.5 or at least 5 or at least 5.5 or at least 6 or at least 7 or at least 8 or at least 9.

Embodiment 37. The abrasive article of embodiment 1, wherein the bonded abrasive body comprises an ABR Factor (Cb/Cap) of not greater than 10, wherein Cb represents the vol % of the bond material for the total volume of the bonded abrasive body and Cap represents the vol % of the abrasive particles for the total volume of the bonded abrasive body, or wherein the ABR Factor (Cb/Cap) is not greater than 9 or not greater than 8.5 or not greater than 8 or not greater than 7.5 or not greater than 7 or not greater than 6.5 or not greater than 6 or not greater than 5.5 or not greater than 5 or not greater than 4.5 or not greater than 4 or not greater than 3.5 or not greater than 3 or not greater than 2.5 or not greater than 2 or not greater than 1.5 or not greater than 1 or not greater than 0.5.

Embodiment 38. The abrasive article of embodiment 1, wherein the bonded abrasive body comprises at least three distinct phases including the bond material, abrasive particles and porosity.

Embodiment 39. The abrasive article of embodiment 1, wherein the bonded abrasive body includes a three dimensional solid network extending throughout the bonded abrasive body, wherein the three-dimensional solid network is made up of abrasive particles joined together with the bond material, and further comprising open porosity extending throughout the bonded abrasive body as an interconnected network of voids in the form of channels.

Embodiment 40. The abrasive article of embodiment 1, wherein the bonded abrasive body comprises a diameter of at least 5 mm or at least 10 mm or at least 20 mm or at least 50 mm or at least 100 mm or at least 200 mm or at least 300 mm or at least 400 mm or at least 500 mm.

Embodiment 41. The abrasive article of embodiment 1, wherein the bonded abrasive body comprises a diameter of not greater than 800 mm or not greater than 700 mm or not greater than 600 mm or not greater than 500 mm or not greater than 400 mm or not greater than 300 mm or not greater than 200 mm or not greater than 100 mm or not greater than 80 mm or not greater than 50 mm or not greater than 30 mm.

Embodiment 42. The abrasive article of embodiment 1, wherein the bonded abrasive body comprises a volume of at least 1 cm3.

Embodiment 43. The abrasive article of embodiment 1, wherein the bonded abrasive body comprises a volume of at least 1000 cm3.

Embodiment 44. The abrasive article of embodiment 1, wherein the bonded abrasive body comprises a thickness of at least 2 mm.

Embodiment 45. The abrasive article of embodiment 1, wherein the bonded abrasive body comprises a thickness of not greater than 400 mm.

Embodiment 46. A method of making an abrasive article comprising: forming a mixture comprising abrasive particles, a bond precursor material and a foaming agent; forming a bonded abrasive body from the mixture, wherein the bonded abrasive body comprises a bond material comprising an inorganic material and further comprising a Solid Phase Variation of not greater than 45%.

Embodiment 47. The method of embodiment 46, wherein forming the mixture includes adding a foaming agent to the mixture.

Embodiment 48. The method of embodiment 47, wherein the foaming agent is added to the mixture first, before the addition of any other components.

Embodiment 49. The method of embodiment 47, wherein the foaming agent comprises hydrogen peroxide.

Embodiment 50. The method of embodiment 47, wherein the foaming agent is added in an amount of at least 0.5 wt % for a total weight of the mixture.

Embodiment 51. The method of embodiment 47, wherein the foaming agent is added in an amount of not greater than 50 wt % for a total weight of the mixture.

Embodiment 52. The method of embodiment 47, further comprising adding a foaming catalyst to the mixture after adding the foaming agent.

Embodiment 53. The method of embodiment 52, wherein the foaming catalyst interacts with the foaming agent to create bubbles in the mixture.

Embodiment 54. The method of embodiment 52, wherein the foaming catalyst comprises a salt including potassium iodide, iron oxide, magnesium oxide, copper oxide, or any combination thereof.

Embodiment 55. The method of embodiment 52, wherein the foaming agent is added to the mixture prior to the addition of a gelling agent.

Embodiment 56. The method of embodiment 55, wherein the foaming catalyst is added to the mixture after the addition of the gelling agent.

Embodiment 57. The method of embodiment 47, further comprising: forming a gel from the mixture; foaming the gel to create a foamed gel; and forming a green body from the high porosity gel.

Embodiment 58. The method of embodiment 57, further comprising adding a cationic agent to the mixture prior to foaming the gel.

Embodiment 59. The method of embodiment 46, wherein forming the mixture includes adding a gelling agent to the mixture.

Embodiment 60. The method of embodiment 59, further comprising adding a cationic agent to the mixture and forming a gel.

Embodiment 61. The method of embodiment 60, further comprising foaming the mixture prior to forming the gel.

Embodiment 62. The method of embodiment 59, further comprising forming a green body from the gel.

Embodiment 63. The method of embodiment 46, further comprising forming a bonded abrasive body from the green body.

Embodiment 64. The method of embodiment 46, wherein the mixture includes a cationic agent includes a compound including sulfates, chlorides, chromates, nitrates, carbonates (e.g., bicarbonates), hydrates or any combination thereof.

Embodiment 65. The method of embodiment 64, wherein the mixture includes at least 0.1 wt % of the cationic agent for a total weight of the mixture.

Embodiment 66. The method of embodiment 46, wherein the mixture includes not greater than 6 wt % of the cationic agent for a total weight of the mixture.

Embodiment 67. The method of embodiment 46, wherein the mixture includes a gelling agent selected from the group consisting of agar, agarose, xanthan gum, carboxy methyl cellulose, gellan gum, carrageenan gum, guar gum, tara gum, cellulose gum, locust bean gum, or any combination thereof.

Embodiment 68. The method of embodiment 67, wherein the mixture includes at least 0.1 wt % of the gelling agent for a total weight of the mixture.

Embodiment 69. The method of embodiment 67, wherein the mixture includes not greater than 10 wt % of the gelling agent for a total weight of the mixture.

Embodiment 70. The method of embodiment 46, wherein the abrasive particles comprise a material selected from the group consisting of oxides, borides, nitrides, carbides, oxynitrides, oxycarbides, amorphous, monocrystalline, polycrystalline, superabrasive or any combination thereof.

Embodiment 71. The method of embodiment 70, wherein the mixture includes at least 20 wt % of the abrasive particles for a total weight of the mixture.

Embodiment 72. The method of embodiment 70, wherein the mixture includes not greater than 80 wt % of the abrasive particles for a total weight of the mixture.

Embodiment 73. The method of embodiment 46, wherein the bond material comprises an inorganic material selected from the group consisting of metal, metal alloy, ceramic, vitreous, or any combination thereof.

Embodiment 74. The method of embodiment 73, wherein the mixture includes at least 1 wt % of the precursor bond material for a total weight of the mixture.

Embodiment 75. The method of embodiment 73, wherein the mixture includes not greater than 30 wt % of the precursor bond material for a total weight of the mixture.

Embodiment 76. The method of embodiment 46, further comprising forming a gel by heating the mixture to a gelling temperature.

Embodiment 77. The method of embodiment 76, wherein the mixture is mixed while heating the mixture to a gelling temperature.

Embodiment 78. The method of embodiment 76, wherein the gelling temperature is at least 50° C. or at least 60° C. or at least 70° C. or at least 80° C. or at least 90° C.

Embodiment 79. The method of embodiment 76, wherein the gelling temperature is not greater than 100° C. or not greater than 90° C. or not greater than 80° C. or not greater than 70° C.

Embodiment 80. The method of embodiment 46, wherein forming the mixture further includes adding a carrier comprising water.

Embodiment 81. The method of embodiment 46, wherein forming the mixture includes adding a dispersant to the mixture, wherein the dispersant is selected from the group consisting of sodium polyacrylate, copolymer with pigment affinic group, ammonium polymeta acrylate, ammonium polyacrylate, polyacrylic acid, ammonium salt in an acrylic polymer in water, citric acid, sodium dodecylbenzenesulfonate, cetyltrimethyl ammonium bromide.

Embodiment 82. The method of embodiment 81, wherein the mixture includes at least 0.1 wt % of a dispersant for a total weight of the mixture.

Embodiment 83. The method of embodiment 81, wherein the mixture includes not greater than 6 wt % of a dispersant for a total weight of the mixture.

Embodiment 84. The method of embodiment 46, wherein forming the mixture includes adding a surfactant to the mixture, wherein the surfactant is selected from the group consisting of sodium lauroyl sarcosinate, sodium laurel sulfate, sodium laurate, sodium stearate, sodium alkyl sulfate, sodium dodecyl sulfate, sorbitan, polyethylene glycol, polysorbate, glycerol monosterate, egg lecithin.

Embodiment 85. The method of embodiment 84, wherein the mixture includes at least 0.1 wt % of a surfactant for a total weight of the mixture.

Embodiment 86. The method of embodiment 84, wherein the mixture includes not greater than 6 wt % of a surfactant for a total weight of the mixture.

EXAMPLES

Example 1

A representative sample (Sample S1) is made according to the following process. A carrier of deionized water is obtained and approximately 3000 kg of water is measured. Approximately 10,000 kg of abrasive particles having an average particle size (D50) of approximately 220 microns, and commercially available as white fused alundum from Saint-Gobain Corporation, is prepared. Approximately 2200 kg of bond precursor material, commercially available as Vitrium from Saint-Gobain Corporation, is also prepared. Approximately 20 g of a surfactant, commercially available as Perlastan L30 from Schill & Seilacher GmbH, is also prepared. Approximately 120 g of a gelling agent, commercially available as Kelcogel from CP Kelco Corporation, is prepared. Approximately 60 g of a dispersant commercially available as Darvan 821A from Vanderbilt Minerals is also prepared. Approximately 20 g of a cationic agent commercially available as calcium chloride from Fisher Scientific is prepared. Approximately 1 kg of a foaming agent commercially available as hydrogen peroxide from Fisher Scientific is prepared. Finally, approximately 10 g of a foaming catalyst commercially available as potassium iodide from Fisher Scientific is prepared.

First, the foaming agent is added to the water while mixing. The gelling agent is then added to the water and foaming agent while mixing. During mixing the mixture is heated at a gelling temperature of approximately 80-85° C. The bond precursor material is then added to the gel, followed by the dispersant, then the abrasive particles, followed by the surfactant, and then the cationic agent. The addition of the cationic agent initiates cross-linking and the formation of the gel.

After adding the gelling agent, the foaming catalyst is added to the mixture to initiate the foaming process, thus the mixture is gelling and foaming simultaneously. The result of the gelling and foaming process is a foamed gel. Mixing is continued in normal atmospheric conditions to facilitate the formation of a suitable foamed gel.

The foamed gel is then poured into a production tool to cast a green body. During casting, no additional pressure or temperature is applied to the foamed gel, and the gel is free cast to form the green body. The foamed gel dries, and the green body stabilizes. It will be understood, that other processes may optionally apply pressure to the foamed gel to form the green body.

After forming the green body, the green body is fired to create a vitreous bond material from the bond precursor material. The firing schedule includes a ramp of approximately 100° C./hr from room temperature to a firing temperature of approximately 910-925° C. with a hold for approximately 8 hours under a normal atmosphere. After a suitable time at the firing temperature, the fired body is cooled with a ramp down of approximately 30° C./hr.

The abrasive article undergoes finishing to finalize the dimensions of the bonded abrasive body. The bonded abrasive body has a Solid Phase Variation of 10%, 7 vol % bond material that consists essentially of a vitreous material, approximately 23 vol % abrasive particles having an average particle size (D50) of 220 microns, approximately 70 vol % porosity, including a majority content of open porosity for the total content of porosity, and an average pore size (D50) of approximately 350 microns, a D90 pore size of approximately 700 microns, and a D10 pore size of approximately 150 microns. Sample S1 had a permeability as defined by a Darcy's number of approximately 420.

Figure 7:
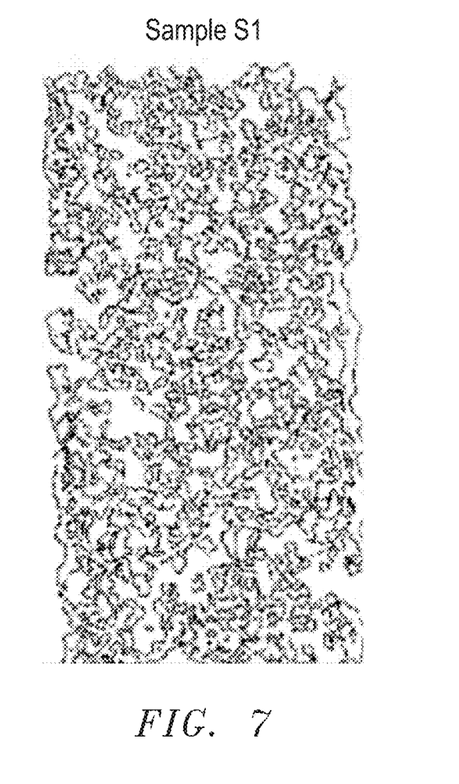
FIG. 7 includes a black and white image generated from a CT scan of a sample of an abrasive article according to an embodiment.

FIG. 7 includes a black and white image generated from a CT scan of a portion of the bonded abrasive body of Sample S1 used to evaluate the Solid Phase Variation.

Example 2

A second sample (Sample S2) is formed using a similar process used to form Sample S1, except that a cationic agent is not added. It had a similar structure to Sample S1 in terms of content of bond material, abrasive particles and porosity. Sample S2 had a Homogeneity Factor of 86.

Figure 8:
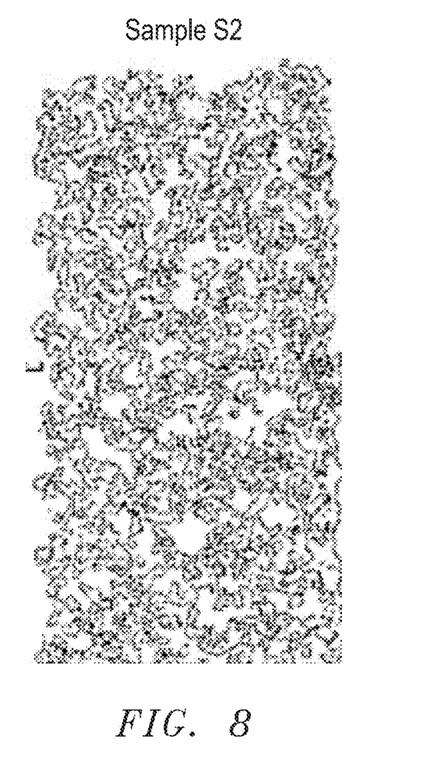
FIG. 8 includes a black and white image generated from a CT scan of an abrasive article.

FIG. 8 includes a black and white image generated from a CT scan of a portion of the bonded abrasive body of Sample S2. FIG. 6 includes plots of percent area used to evaluate the Homogeneity Factor for Samples S1 and S2.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any sub combination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive. Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings. However, other teachings can certainly be used in this application.

As used herein, the terms "comprises," "comprising," "includes," "including," "has," "having" or any other variation thereof, are intended to cover a non-exclusive inclusion. For example, a method, article, or apparatus that comprises a list of features is not necessarily limited only to those features but may include other features not expressly listed or inherent to such method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present)

Also, the use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single item is described herein, more than one item may be used in place of a single item. Similarly, where more than one item is described herein, a single item may be substituted for that more than one item.

Unless otherwise defined, all technical and scientific terms used herein have the same meaning as commonly understood by one of ordinary skill in the art to which this invention belongs. The materials, methods, and examples are illustrative only and not intended to be limiting. To the extent not described herein, many details regarding specific materials and processing acts are conventional and may be found in reference books and other sources within the structural arts and corresponding manufacturing arts.

The above-disclosed subject matter is to be considered illustrative, and not restrictive, and the appended claims are intended to cover all such modifications, enhancements, and other embodiments, which fall within the true scope of the present invention. Thus, to the maximum extent allowed by law, the scope of the present invention is to be determined by the broadest permissible interpretation of the following claims and their equivalents and shall not be restricted or limited by the foregoing detailed description.

What is claimed is:

1. A method of making an abrasive article comprising:
    forming a mixture comprising abrasive particles having an average size of at least 200 microns, a bond precursor material, and a foaming agent;
    adding a foaming catalyst to the mixture, wherein the foaming catalyst interacts with the foaming agent to create bubbles in the mixture; and
    forming a bonded abrasive body from the mixture, wherein the bonded abrasive body comprises a bond material comprising an inorganic material and further comprising a permeability as defined by Darcy's number of at least 350.

2. The method of claim 1, wherein the foaming agent comprises hydrogen peroxide.

3. The method of claim 1, wherein the foaming agent is in an amount of at least 0.5 wt % and not greater than 50 wt % for a total weight of the mixture.

4. The method of claim 1, wherein the foaming catalyst comprises a salt including potassium iodide, iron oxide, magnesium oxide, copper oxide, or any combination thereof.

5. The method of claim 1, further comprising adding a gelling agent to the mixture, wherein the gelling agent is selected from the group consisting of agar, agarose, xanthan gum, carboxy methyl cellulose, gellan gum, carrageenan gum, guar gum, tara gum, cellulose gum, locust bean gum, or any combination thereof.

6. The method of claim 5, further comprising adding a cationic agent to the mixture and forming a gel.

7. The method of claim 1, comprising forming a gel by heating the mixture to a gelling temperature.

8. The method of claim 7, wherein the mixture is mixed while heating the mixture to the gelling temperature.

9. The method of claim 1, further comprising:
forming a gel from the mixture;
foaming the gel to create a foamed gel; and
forming a green body from the foamed gel.

10. The method of claim 1, wherein the abrasive particles are unagglomerated.

11. The method of claim 1, wherein the bonded abrasive body comprises:
a diameter of at least 5 mm and not greater than 800 mm;
a volume of at least 1 cm$^3$ and not greater than 1000 cm$^3$;
a thickness of at least 2 mm and not greater than 400 mm; or
any combination thereof.

12. The method of claim 1, wherein the mixture includes a cationic agent including a compound including sulfates, chlorides, chromates, nitrates, carbonates, hydrates or any combination thereof.

13. The method of claim 12, wherein the mixture includes at least 0.1 wt % and not greater than 6 wt % of the cationic agent for a total weight of the mixture.

14. The method of claim 1, forming the mixture includes adding a dispersant to the mixture, wherein the dispersant is selected from the group consisting of sodium polyacrylate, copolymer with pigment affinic group, ammonium polymeta acrylate, ammonium polyacrylate, polyacrylic acid, ammonium salt in an acrylic polymer in water, citric acid, sodium dodecylbenzenesulfonate, and cetyltrimethyl ammonium bromide.

15. A method of making an abrasive article comprising:
forming a mixture comprising abrasive particles having an average size of at least 200 microns, a bond precursor material, and a foaming agent, wherein the foaming agent is a reactant to a foaming process, wherein forming the mixture includes adding a surfactant to the mixture, wherein the surfactant is selected from the group consisting of sodium lauroyl sarcosinate, sodium laurel sulfate, sodium laurate, sodium stearate, sodium alkyl sulfate, sodium dodecyl sulfate, sorbitan, polyethylene glycol, polysorbate, glycerol monosterate, egg lecithin; and
forming a bonded abrasive body from the mixture, wherein the bonded abrasive body comprises a bond material comprising an inorganic material and further comprising a permeability as defined by Darcy's number of at least 350.

16. The method of claim 15, further comprising adding a foaming catalyst to the mixture, wherein the foaming catalyst interacts with the foaming agent to create bubbles in the mixture.

17. A method of making an abrasive article comprising:
forming a mixture comprising abrasive particles, a bond precursor material, a foaming agent, and a gelling agent, wherein the bond precursor material comprises an inorganic material, and wherein the gelling agent is selected from the group consisting of agar, agarose, xanthan gum, carboxy methyl cellulose, gellan gum, carrageenan gum, guar gum, tara gum, cellulose gum, locust bean gum, or any combination thereof;
adding a foaming catalyst to the mixture, wherein the foaming catalyst interacts with the foaming agent to create bubbles in the mixture;
forming a bonded abrasive body from the mixture, wherein the bonded abrasive body comprises a porosity within a range of at least 55 vol % to not greater than 90 vol % for a total volume of the bonded abrasive body, a permeability as defined by Darcy's number of at least 350, or a combination thereof.

18. The method of claim 17, further comprising forming a gel by heating the mixture to a gelling temperature.

19. The method of claim 17, wherein the foaming agent comprises hydrogen peroxide.

20. The method of claim 17, wherein the foaming catalyst comprises a salt including potassium iodide, iron oxide, magnesium oxide, copper oxide, or any combination thereof.

* * * * *